Oct. 18, 1960  W. J. METZGER  2,956,695
TRANSITIONAL COUPLING DEVICE
Filed Jan. 23, 1959  2 Sheets-Sheet 1
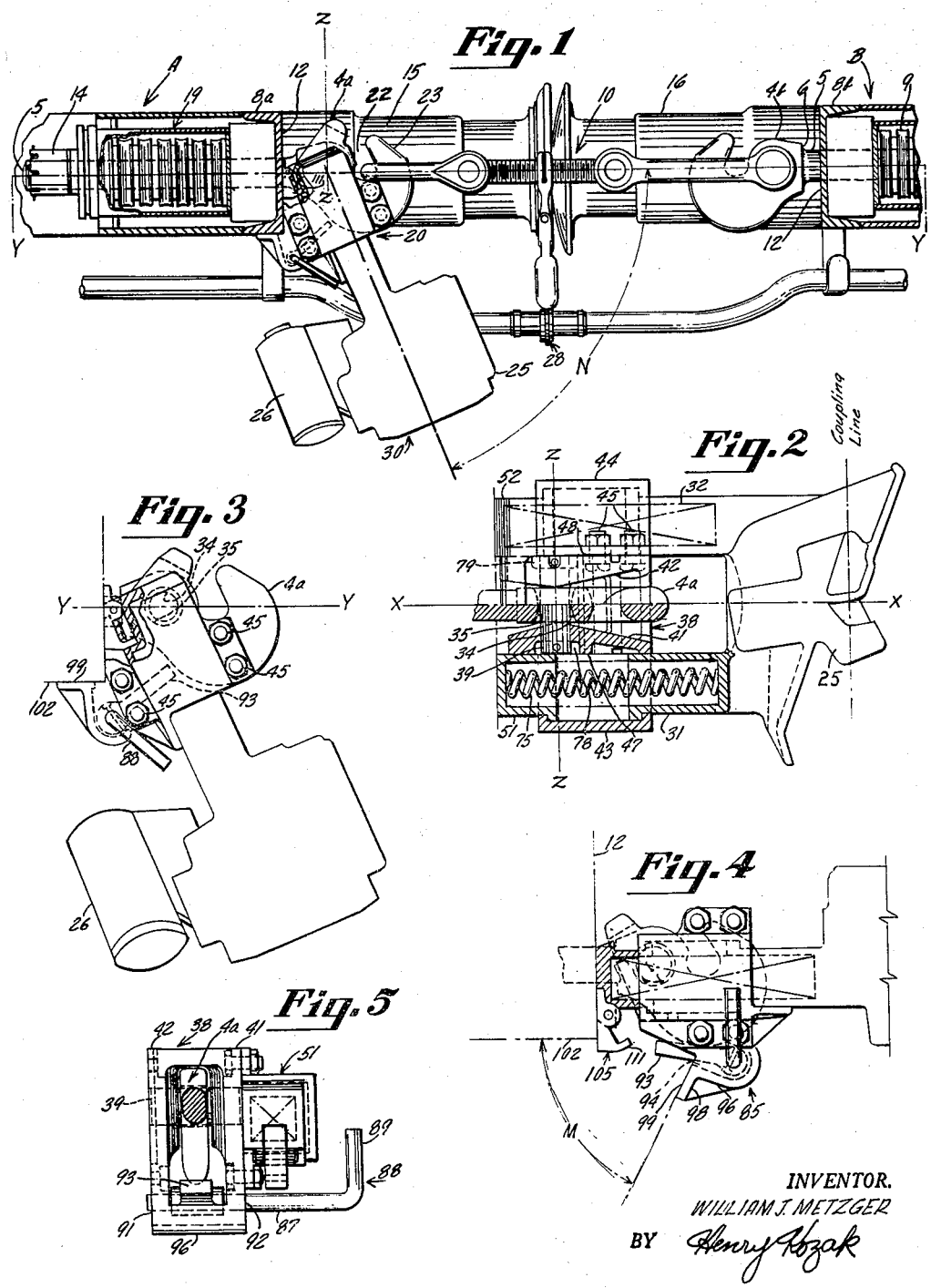
INVENTOR.
WILLIAM J. METZGER
BY Henry Kozak
ATTORNEY

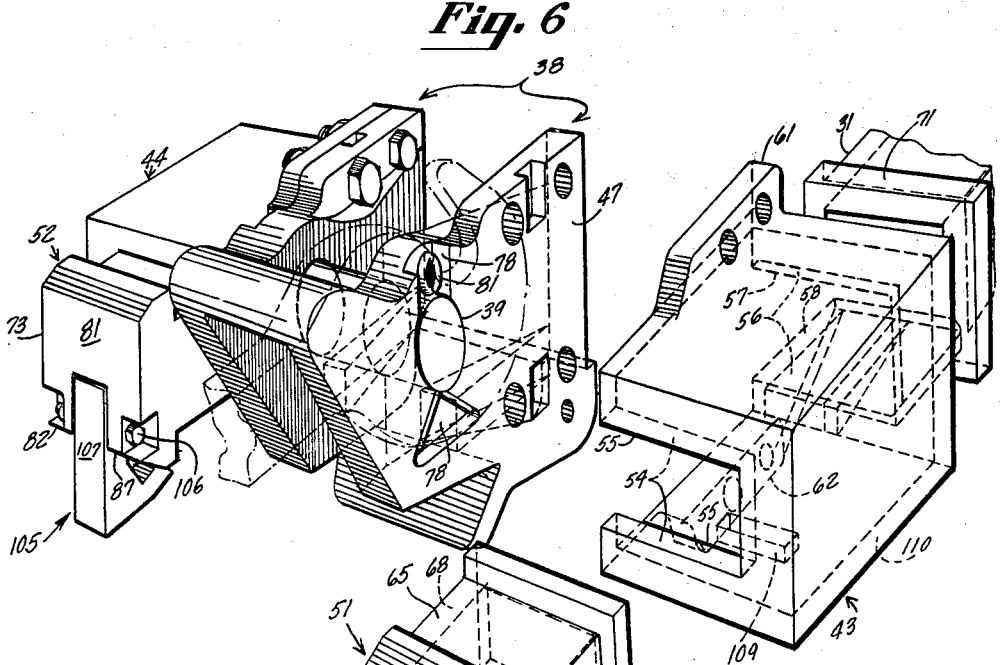

United States Patent Office 2,956,695
Patented Oct. 18, 1960

2,956,695

TRANSITIONAL COUPLING DEVICE

William J. Metzger, East Cleveland, Ohio, assignor to National Malleable and Steel Castings Company, Cleveland, Ohio, a corporation of Ohio Filed Jan. 23, 1959, Ser. No. 788,531

27 Claims. (Cl. 213—112)

This invention relates to railway transitional coupling devices which are particularly adapted for attachment to existing coupling facilities of railway vehicles.

In many countries wherein the rolling equipment of the public railways is equipped with manually-operated coupling systems, it is desirable to be able to change to equipment which couples automatically and may be uncoupled by a simple outboard lever operation, for example, in the manner found on the public railways of North America. The advantages of increased safety, economical use of labor, simplified vehicle construction, and faster classifying of cars in making up trains arising out of the use of North American coupling system are fairly obvious. However, a sudden switch from one system to another is uneconomical, if not impossible, and requires the utilization of transition equipment enabling the use of prevailing old-style vehicles during an interim change-over-period.

The transitional coupling devices of the prior art cannot, in general, be applied directly to vehicles carrying their original coupling equipment without modification, or at least partial replacement, of such original equipment.

The present invention arises through perception that minimum disruption and loss of service is possible in a period of change-over from obsolete equipment to improved equipment through the installation of transitional devices on units of the obsolete equipment without any change of structure therein or without interfering with its capability for its usual functions and mode of operation. The invention is also to be useful in adapting diverse types of railway rolling equipment to be interconnected in trains when conversion is not contemplated.

Hence, a major object of this invention is to provide a transitional coupling device for installation on existing car coupling facilities without modification therof.

Another object is to provide a device in accordance with the foregoing object which may be easily shifted to an inoperative position to expose the original coupling facilities of a vehicle for operation.

A further object is to provide a device in accordance with the foregoing objects carrying a coupler head which may be easily manually shifted from its operative position to its inoperative position and vice versa.

Still another object is to provide a transitional coupling device adapted for mounting on an original coupling facility that is movable relative to its associated vehicle in the draft direction thereof, the device being adapted for being locked in a fixed inoperative position relative to such coupling facility.

A still further object is to provide a transitional coupling device having an automatically-coupling coupler head and a built-in buffing system for absorbing coupling shocks and to accommodate the travel of the coupler head relative to the original coupling facility on which the device is mounted. Such travel is necessary for self-adjustment of the device in cooperating with a side buffing system.

Another object is to provide a transitional coupling device in accordance with the foregoing objects particularly adapted for use on the prevailing West European type of railway equipment using the draw-hook and side-buffer type of coupling system.

It is also an object to provide a transitional coupling device providing automatic coupling of the vehicle and their associated service line connections.

Generally speaking, these and other objects are achieved in a transitional coupling device in accordance with the present invention, adapted to be pivotally mounted on a coupling member, such as a draw-hook, of a railway vehicle with one or more resiliently supported rear thrust elements of the device in cushioned engagement with an end surface of the vehicle from which the coupling member projects.

In a preferred embodiment, the coupler head carried by the device may, through yielding of the one or more thrust elements relative to the other portions of the device, be tilted out of operative position to expose the coupling member for use as originally intended.

The transitional coupling device, considered independently, and with respect to its normal horizontally-aligned operative position for coupling, and with respect to forward and rearward directions in the central longitudinal plane of the device in such position, comprises a forwardly-facing coupler head; supporting means, such as a housing, for supporting the coupler head forwardly thereof; pivotal means, such as a horizontal pin aligned crosswise of the central vertical plane and a central chamber of the housing, for attaching a device to, and in pivotal relation with, the coupling member; thrust means, such as plunger-like elements projecting rearwardly from interiorly of the supporting means and reciprocably supported thereby, for engaging the end surface of the vehicle; and cushioning means, such as springs housed within the supporting means, acting on the thrust means to urge the latter rearwardly; the thrust means being provided with rearward-facing engaging areas adapted for face-to-face engagement of the end surface with such areas and the end surface extending to a level substantially below that of the axis of the connecting means to facilitate the support of the device in its horizontally aligned position.

Considering now the drawing with respect to which the invention is described in greater detail:

Fig. 1 is a fragmentary longitudinal section of portions of two railway vehicles and the draw-hook side-buffer coupling system used to couple the vehicles, and the transitional coupling device of the invention in an inoperatvie position.

Fig. 2 is a plan view partly in secton illustrating the transitional device in an operative position and the turnbuckle mechanism of the draw-hook system removed.

Fig. 3 is an enlarged side elevation of the transitional device illustrated in Figs. 1 and 2 in an inoperative position illustrating particularly the mechanism of the device for locking it in the inoperative position.

Fig. 4 is a fragmentary side elevation, partly in section, illustrating the device in its operative position and the locking mechanism in an inoperative condition.

Fig. 5 is a fragmentary rear end elevation of the device shown in the previous figures with parts removed at the left side of the figure.

Fig. 6 is a partially exploded perspective view, with some parts deleted, of primarily the main housing portion of the device and associated thrust elements. Shown also is a portion of a conventional draw-hook drawn in ghost outline and extending into the central chamber of the housing.

Fig. 7 is a side elevation of a thrust element shown in Fig. 6.

Fig. 8 is a fragmentary side elevation of a non-tilting embodiment of the invention which may function as a transitional coupling facility capable of absorbing buffing forces.

Fig. 9 is a fragmentary plan view of the device shown in Fig. 8.

Fig. 1 illustrates a typical conventional draw-hook side-buffer coupling system such as prevalently used in Western Europe. As shown, cars A and B are equipped with draw-hooks 4a and 4b, respectively. The hook in each case is fixed to a shank 5 which forms a shoulder 6 with the rear-end surface of the hook. The shank 5 extends in each case rearwardly from the hook through the end sill 8a or 8b of the associated vehicle A or B, and continues rearwardly through a draft gear or cushion device 9 which functions only in draft.

The shank 5, in being subjected to tension, transmits compressive loads to the gear 9 through a nut and washer assembly 14. In the normal operation of a car in which the draft gear 9 is situated, the shoulder 6 stands away from the surface 12 of the sill 8a or 8b under tension arising through the normal adjustment of a turnbuckle connector or screw coupling 10. However, it is customary to allow a clearance between the shoulder 6 and the sill at the no-load condition of the draft gear 9.

The cars A and B are ordinarily secured by the turnbuckle connector 10 with the tension exerted by the connector opposed by compression equal to compression force shared by two sets of side buffers of which but one pair, i.e., buffers 15 and 16, as shown in Fig. 1. As illustrated, buffer 15 is mounted on the end sill 12 at the extreme right side of the car A in opposition and longitudinal alignment with the buffer 16 mounted on the extreme left end of the sill 12 in the car B. The other pair of buffers (not shown) are mounted on the left end of the end sill of car A and the right end of the end sill of car B.

Fig. 1 shows a transitional coupling device 20 pivotally attached to the draw-hook 4a in its downwardly inclined inoperative position wherein it exposes from either lateral direction of the car A the contour of a clevis-receiving slot 22 formed by the upwardly extending beak or neb portion 23 of the hook 4a.

As indicated by the drawing, the hooks at either end of a car are typified in the manner of draw-hooks 4a and 4b provided with a hole extending through the hook just to the rear of the slot 22 along a generally horizontal axis Z—Z in transverse relation with the coupling line Y—Y or longitudinal axis of the coupling mechanism. The device 20 includes a coupler 30 having a coupler head 25 exemplary of any type of coupler head, preferably that of an automatic coupler. However, in the embodiment shown, the head 25 (see Fig. 2) is depicted as that of one of the conventional Willison types of couplers, well-known for their automatic operation. Integrally connected with, and subjacent to, the coupler head is an air supply line connection 26 adapting the device 20 for automatic car-to-car coupling of the air service line of a train, when the coupling of cars is effected through the use of intercoupled devices 20. The rear end of the connection 26 is adapted for being joined with the terminal connector portion of the flexible hose normally provided on a conventional car. However, the combination of a coupler head and a service line connection is well-known in the prior art and is not advanced as a feature of this invention. Fig. 1 shows the air service line coupled at 28 with the line connectors conventionally supplied on cars typified by cars A and B.

The coupler 30 is unconventional in respect to the manner in which the head 25 is supported in that it comprises a pair of shanks 31 and 32 spaced in a horizontal direction about equidistant from the central longitudinal vertical plane X—X of the device. The plane X—X contains the coupling line Y—Y of Fig. 1 insofar as it passes through the coupling system of car A. As the drawing indicates, plane X—X is the vertical central plane of the hook 4a. The draft or coupling line Y—Y passes horizontally through the axis Z—Z hereinabove described. The hole of the hook along axis Z—Z tapers inwardly to the plane S—S from a larger periphery 35 at each end of the opening to a smaller periphery 34 midway between the lateral sides of the hook. This taper is clearly shown by cross-section in Fig. 2.

The transitional coupling device 20 comprises, as shown in Figs. 1 to 6, the twin-shank coupler 30, an adapted 38 forming a central portion of the device, a pin 39 received in co-axial openings in the lateral walls 41 and 42 of the adapter, caps 43 and 44 of generally U-shape vertical transverse cross-section, and fasteners such as bolts 45 for securing the caps to outward facing lateral surfaces 47 and 48, respectively, of the adapter walls 41 and 42, a pair of thrust elements 51 and 52, and a pair of springs 75 arranged as hereinafter described.

The adapter surfaces 47 and 48 are parallel and normally disposed in vertical planes under operative conditions. The caps 43 and 44 are secured to the adapter 38 in a manner to close the open end of the U-shape cross-section of the caps and thus cooperate with the wall surfaces 47 and 48 to form a horizontal passageway within each cap parallel to the plane X—X. Either passageway terminates in a front opening and a rear opening defined by transversely extending flanges of the cap which result in openings of smaller area than that of the transverse cross-section of the passageway between its openings.

For example, the cap 43 has a rear opening 54 defined by a flange 55 extending generally within a plane in transverse relation to the vertical plane X—X. The cap 43 has a front opening 56 formed by a flange 57 extending along two rectilinear sides of the opening and by a horizontal upwardly facing shelf 58. The peripheries of these openings are closed and rendered four-sided when the cap is bolted against the wall surface 47. Caps 43 and 44 may be constructed with front and rear openings of similar size to simplify their manufacture. However, because of the non-symmetrical placement of the bolt-receiving flanges 61 and 62, they are produced as "rights" and "lefts" and the cap 43 is therefore not interchangeable with cap 44.

The shanks 31 and 32 of the coupler 30 and the thrust elements 51 and 52 are provided with flanges which fit within the inner cross-section of the caps 43 and 44 and are larger in periphery than the peripheries of the openings 54 and 56. For example, the thrust element 51 has a flange 64 extending transversely outwardly with respect to three of its rectilinear side walls 65, 66, and 67. The flange 64 fits readily within the interior of the cap 43 but is larger in periphery than the opening 54. The flange 64 is not extended along the wall 68 in order that this wall may rest normally slidably against the surface 47 of the adapter 38.

A flange 71 is similarly constructed and provided on the shank 31. That is to say, flange 71 is smaller than the inner transverse cross-section of the cap 43 but larger than the front opening 56.

The longitudinal middle section of the thrust element between the flange 64 and the rear abutment plate portion 73 has a transverse cross-section not exceeding the size of the opening 54. Likewise, the transverse cross-sections of the portions of the shanks 31 and 32 do not exceed in cross-sectional area the size of the front openings of the caps 43 and 44. As a result, the flange portions of either the thrust members or the shanks are traversable within the caps and the adjacent portions of the elements and shanks of smaller cross-sections are traversable through the openings of the caps. Considering particularly the portions of the device shown detached from the adapter in Fig. 6, the cap 43, when detached from the adapter, may receive the portions of the thrust element 51 and the shank 31 of smaller cross-section within the openings 54 and 56, respectively, from a lateral direction. This may be easily accomplished with the ends of a spring 75 extending into the hollow interiors of the element 51 and the shank 31. In this case, the thrust element and the shank are held in a fixed longitudinal spacing by means, such as a clamp, to place the spring under compression and the flanges 64 and 71 closer together than the flanges 55 and 57 of the cap.

Then the detached cap 43 may be moved in a lateral direction to bring the peripheries of its front and rear openings into encircling relation with longitudinally intermediate portions of the shank 31 and the thrust element 51 to trap the flanges 64 and 71 inside the cap flanges 55 and 57, respectively. Thereupon, the thrust element and the coupler shank may be released against adjacent flanges within the cap. The cap, aided by the expansion force of the spring 75, causes the sub-assembly of the cap, spring, thrust element, and the shank to assume a self-supporting, somewhat rigid alignment. In a similar manner, a sub-assembly including the other shank, cap, thrust element, and spring may be assembled.

With the adapter 38 pinned (pin 39) to the draw-hook 4a, assembling of the device 20 may now be readily completed. Obviously, the adapter must first be mounted on the draw-hook, since the pin 39 cannot be inserted once the caps 43 and 44 are in place on the adapter. The shanks 31 and 32 are in fixed relation and integral with the coupler head 25. Hence, an assembly including the coupler 30 and the sub-assemblies supported on the shanks of the coupler as just described may be placed over the adapter 38 to dispose the latter between the caps and in a position for inserting bolts for connecting the caps to the adapter.

As shown in Fig. 4, the walls of the adapter 38 are indented from the outer lateral surfaces 47 and 48 to provide recesses 78 and 79, respectively, in which opposite end portions of the pin 39 are exposed for receiving cotter keys 81. The length of the pin 39 is slightly shorter than the distance between the opposite faces 47, 48 of the adapter so that the caps 43 and 44 may fit tightly thereagainst.

The device 20 is capable of horizontal angling relative to the draw-hook 4a as a result of: (1) tapering the transverse hole through the draw-hook inwardly from opposite sides thereof, and (2) the tapering of the inwardly facing lateral surfaces of the walls 41 and 42 toward an intersection of the longitudinal vertical plane X—X and the transverse axis Z—Z. The inward face of either lateral wall of the adapter comprises surface portions meeting in a vertical ridge adjacent the opposing lateral surface of the hook 4a. Each of the opposite inner surfaces of the adapter thereby diverges laterally away from the hook in both rearward and forward directions in an angle in the range of perhaps 8° to 15° with the side surfaces of the hook. The smallest diameter of the tapered hole of the hook provides a small clearance with the pin 39 enabling a corresponding freedom of angling of the pin relative to the hook. In this manner, a pair of devices 20, intercoupled to connect two vehicles, function, as to angling freedom, in the manner of the conventional turnbuckle connection as the vehicles negotiate curves or sway relative to each other. However, the devices tend to be self-aligning with respect to the respective associated vehicles because of the pressure exerted by their thrust elements, e.g., 51 and 52 against the end sills of the vehicles.

In the upward position of the device, as shown in Fig. 4, rearward-facing areas 81 of the thrust elements engage corresponding opposed areas of the end sill 12 in face-to-face relationship. In order to firmly support the device in its upward position, these areas should engage with clearance between the shoulder 6 of the draw-hook 4a and the end sill. This condition is usually accompanied by a slight compression of the draft gear 9. The vertical extent of the areas 81 below the pivotal axis Z—Z of the device 20, i.e., the axis of the pin 39, determines in a proportional manner the force that will be needed to move the device to its downwardly tilted position as shown in Figs. 1 and 3.

As a practical manner, satisfactory support of the device in its upward position is achieved when the force required to tilt it downwardly is that which can be exerted by a man, without the aid of any tools, bearing downwardly on the head 25. For easy manual operation, the force required to tilt the device from its upward position should not exceed about 75 pounds applied downwardly in a vertical direction to the head 25.

In the typical European train of draw-hook side-buff vehicles, the coupling line (the transverse axis at the midpoint between two adjacent vehicles along which automatic couplers may intercouple) is about 2 feet from the end sill of the vehicle. In the use of the present invention, the pivot axis of the device and that of the draw-hook hole is about 4" from the end sill. Accordingly, the expansion force exerted by the springs 75 on both sides of the device, the friction against the end sill exerted by the thrust elements, and the disposition of the lower extremities 82 of the engaging areas 81 downwardly from the pivotal axis of the device are correlated to produce a moment preventing tilting of the device not exceeding about 125 ft./lbs., though it is realized that a large man could readily exert 200 ft./lbs. at the radius provided by the head 25.

In general, the maximum moment of resistance will be encountered when the device 20 has been tilted to a position just before the corners or extremities 82 of the thrust elements become aligned along a radius of the axis X—X perpendicular to the end surface of the sill 12. At the position of the device shown in Figs. 2 and 4, the relative positions of the vehicle end surface provided by the sill 12, the axis X—X, and the device 20 are such that the difference of the distance between the axis and the sill end surface and the distance between the axis and the corners 82 is less than the range of movement through which the thrust elements (i.e., the distance between the abutment plates 51, 52 and the rear surfaces of the caps 43 and 44) may move away from the sill toward the caps at the upward position of the device.

With this relationship observed, the thrust elements have sufficient range of movement relative to the supporting means or housing portion of the device (i.e., the adapter plus the caps) to allow tilting of the device to a position wherein inclined, rearwardly facing surfaces 83 of the elements engage the sill surface 12 in face-to-face relation. The surfaces 83 extend, at the position shown in Figs. 2 and 4, forwardly and downwardly from the corners 82.

As long as the draft gear 9 maintains the device in its tilted position with surfaces 83 in engagement with the end surface 12, as shown in Figs. 1 and 3, the vertically angled relation of the device with the draw-hook 4a will not vary. However, when the compressive capacity of the gear 9 resisting deformation is exceeded, the device is displaced forwardly from the sill surface and one or both of two undesirable conditions may then result. In one instance, the thrust elements 51 and 52 will tend to move outwardly of respective caps in order to maintain engagement with the sill surface. When the excessive draft force disappears and the draft gear urges the device closer to the sill, the thrust elements are unable to return inwardly of the caps because of excessive friction and wedging developed between the end-surface 12 and thrust elements and by the thrust element relative to its cap. The other difficulty which arises by movement of the device, while in its tilted position away from the sill, is that if the thrust elements are prevented from moving outwardly to prevent the undesirable conditions above mentioned, the device is free to swing in proportion to its displacement from the end sill.

To overcome these difficulties, a preferred embodiment of the invention includes anti-swing structure operative at the lower position of the device, and structure for locking the thrust elements in fixed position with the caps.

The anti-swing structure of the device 20 consists, as shown in Fig. 4, of an underbridge 85 of the adapter forming its lower forward portion and functioning as one of the transversely extending cross-ties for connecting the walls 41 and 42 of the adapter. To form the underbridge 85 the walls 41 and 42 are extended downwardy to provide coaxial bearing portions 91 and 92 having holes adapted to receive the shaft portion 87 of a lever 88 having a handle portion 89 extending at right-angles to the shaft portion. Mounted on the shaft portion between the bearing portions 91 and 92 is an arm 93 keyed or otherwise fixed to the shaft. The arm 93 is rotatable between a stop position against a rear corner 94 of the transverse connecting wall 96 and the forward upturned portion of the wall 96 which serves as a stop for the arm 93 when rotated to its anti-swing position (shown in Fig. 3) wherein its radially outer end is positioned in subjacent relation with the undersurface of the hook 4a. At this position of the lever 88 substantial counterclockwise movement of the device relative to the hook 4a is impossible.

The underbridge 85 futher includes a transverse wall 98 extending downwardly from the lateral walls 41 and 42 and at practically right angles with the rear end of the wall 96. The wall 98 has a rearwardly facing flat surface 99 having an angle M with the undersurface 102 of the end sill 8a equal to the angle N (see Fig. 1) though which the device 20 moves from its operative position to its lower inoperative postion. When the device 20 is tilted from the position of Fig. 4 to the position of Figs. 1 and 3, the suface 99 engages the surface 102 in face-to-face relation.

Looking now at Fig. 3, such engagement prevents the device fom swinging in a clockwise direction and the wall 99 may slide in a longitudinal direction of the vehicle over the surface 102 without interfering with movements of the daw-hook and the device away from the surface 12. The arm 93, at this position, is radially aligned directly at the undersurface of the hook 4a with its end having small clearance therewith to prevent rotation of the device in the counterclockwise direction. Hence, the device is effectively locked against rotation in either direction.

To prevent upwanted movement of the thrust elements 51 and 52 in a direction rearwardly of the caps 43 and 44, respectively, in the tilted position of the device 20, each of these elements carries a latch 105 connected in rotatable relation with its associated element by a rivet 106 or other equivalent fastening means aligned within each element to allow each latch to pivot with respect to a horizontal transverse axis. The rivets 106 are located inwardly of the abutment plates of both elements so that the rear surface 107 of each latch will be flush with rear areas 81 of the elements in the raised position of the device (see Fig. 4), and flush with the angled surfaces 83 of the elements when the device is in its inclined position of Figs. 1 and 3.

Looking at cap 43 in Fig. 6, the underwall 110 is cut out to provide a transversely elongate opening 109 for receiving a toe 111 of the latch 105. When the thrust element 51 is forced inwardly of the cap and the latch 105 is rotated to a position placing its rear surface 107 in flush relation with the inclined surface 83 of the thrust element, as required in reaching the position of Figs. 1 and 3, the toe 111 enters and becomes positioned in the opening 109, as shown in Fig. 1 (see the cut-away section). In this manner, both thrust elements 51 and 52 are secured against excessive protrusion from respective caps during inoperative positioning of the transiti device. Consequently, the device 20 may be carried ward by the hook 4a away from the end sill 8a v held in fixed angled alignment by the anti-swing me nism hereinabove described, with the latches 105 of thrust elements locking the elements from maintai engagement with the sill surface 12. As the expar pressure exerted by the spring of each cap is desir in the order of at least 500 pounds, the latch 105 is tionally secured against the rear side of the perip of the opening 109, thereby preventing withdrawal the inclined surfaces 83 again engage the sill surfac regardless of any contemplated service condition of sl or vibration.

It is foreseen, in the use of this invention, that the casion may easily arise wherein it is desired to vert a railway system, practically over night, to a matic coupling operation. In this event, it is pos to eliminate those structural features that permit ti of the transitional coupling device to an inoperative tion. Hence, the invention includes a less expensive sion of simplified design intended for mounting or existing coupling facility in permanent operative pos in the form illustrated in Figs. 8 and 9.

This latter transitional coupling device 115 has a tral adapter 116 attached to the draw-hook 4a in same manner as described with respect to the earlier bodiment. The device 115 further includes caps 43 44 which may be identical to those in the earlier emt ment except for omission of the opening 109 in the bo wall 110. There is no necessity for such an openir the present embodiment, as tilting is not contempl: For this reason, the thrust elements 117 and 118 dc require lock latches, such as latches 105. The rear ment plates 119 of the elements extend further d wardly below the level of the pivotal axis 121 of the vice 115 than found in the earlier described embodii to prevent tilting of the device out of its operative tion. The abutment plates may be extended to the l edge 122 of the sill 8a for maximum resistance to ing. If desired, the front face of the sill and the ment plates may be co-extended below the level of st ard sill construction in a manner not shown.

An obvious difference between the adapters of the embodiments is that since room need not be prov within the central chamber of the adapter 116 to th tent needed for rotatability of the device in the ea embodiment, heavier transverse ties 124 and 125 ext ing between and connecting the lateral walls 126 127 of the adapter 116 may be used. Further differe are that the upper portion of the adapter 116 is not toured to expose the clevis-receiving slot 22 of the l 4a, and the adapter does not include the equivaler the bearing portions 91, 92, the anti-swing lever 93, the anti-swing wall 99.

The device of Figs. 8 and 9, in addition to its u as a transitional coupling facility, fulfills a basic req ment or objective of the invention, i.e., to provide a pling device with buffing action that would otherwis absent were the thrust elements 117 and 118 in cushioned relation with the housing structure of the vice comprising the adapter 116 and the caps 143 144. This relationship is necessary in order that suc ful coupling may be effected with automatic coup The arrangement of the thrust elements, their dividual cushioning action, and the ability of the sp loaded thrust elements to effect self-alignment of device according to either embodiment herein descr also facilitates the coupling of automatic coupler l used in such devices. The devices are thereby perm to angle relative to its associated vehicle as they into intercoupled relationship. These features are m additive to the many other features herein discusse overcoming the peculiar difficulties arising out of viding a satisfactory transitional coupling device for use on draw-hook side-buffer type vehicles.

The terms and expressions which have been employed are used as terms of description and not of limitation and there is no intention of excluding such equivalents of the invention described or of the portions thereof as fall within the purview of the claims.

What is claimed is:

1. A transitional coupling device for use in a vehicle having a vertical end surface and a coupling member extending away from the surface in the forward or draft direction of the vehicle; said device comprising, with respect to its normal horizontally aligned operative position for coupling, and a vertical longitudinal plane of the device in said position; a coupler head facing in said forward direction; means for supporting the coupler head forwardly of said means; pivotal means for attaching the supporting means to, and in pivotal relation with, said coupling member; thrust means supported by the supporting means for longitudinal reciprocation relative thereto, and projecting rearwardly from the supporting means; and cushioning means acting between the support means and the thrust means urging the latter rearwardly; the thrust means having a rearward-facing abutment area adapting the thrust means for face-to-face engagement with said end surface at said position of the device; the abutment area extending to a level below that of said axis at said position of the device.

2. The device of claim 1 wherein: the cushioning means resiliently engages the thrust means throughout a range of said reciprocation greater than the difference of the horizontal distance between said axis and said rearward facing abutment area and the distance between said axis and the lower extremity of said abutment area adapting said device during service to be tilted downwardly to an inoperative position relative to said end surface of a vehicle.

3. The device of claim 2 wherein: said thrust means has a rearwardly-facing inclined surface extending downwardly from the lower extremity of the abutment area and forwardly at an angle with the plane of said area.

4. The device of claim 1 wherein: said abutment area extends to a level rendering the device substantially non-tiltable with respect to the end surface of a vehicle supporting said device.

5. A transitional coupling device for use in a vehicle having a vertical end surface and a coupling member extending away from the surface in the forward or draft direction of the vehicle; said device comprising, with respect to its normal horizontally-aligned operative position for coupling, and the central vertical longitudinal plane of the device in said position; a housing substantially open along a central longitudinal vertical plane to form a chamber between two vertical side walls; means extending between said walls along an axis perpendicular to said vertical plane for connecting the device pivotably to said member; said housing having two parallel channelways at opposite sides of the chamber extending horizontally, at said position between respective terminal forward and rear openings; a coupler having a coupler head facing forwardly at said position, and a pair of horizontally-spaced parallel shanks extending in a rearward direction with respect to said draft direction, each shank extending through one of said front openings into the associated channelway; said housing and shanks having cooperating stop portions preventing complete withdrawal of the shanks from the channelways; a pair of thrust elements, each extending through one of said rear openings into the associated channelway; said spring means compressibly enclosed within each channelway between and reacting with the element and shank extending into said channelway; the thrust elements having rear abutment areas extending downwardly to a level below said axis at said position of the device adapted for face-to-face engagement by said end surface.

6. The device of claim 5 wherein: each thrust element and the housing have cooperating stop portions preventing complete withdrawal of the elements from the channelways.

7. The device of claim 6 wherein: the housing comprises a central adapter comprising said side walls connected by cross-tie means; and a pair of caps in detachable relation with the outer sides of the adapter and in cooperation with the adapter forming said channelways.

8. The device of claim 5 wherein: the thrust elements have rear abutments of greater vertical length than the rear openings of the passageways, each of said abutments provides one of said abutment areas and a rearward facing inclined surface extending downwardly from the lower extremity of the abutment area and forwardly at an angle with the plane of said area; the lower portion, including said lower extremity, of each abutment has a recess indented forwardly from a lower section of its abutment area and the inclined surface thereof; a latch having a rear flat surface is supported within the recess pivotally with respect to a horizontal axis; said latch and the flat surface extend downwardly beyond said abutment area; said latch axis is located relative to the abutment for pivoting of the latch between a position wherein said flat surface thereof is flush with said area and a position wherein it is flush with said adjacent inclined surface adjacent said area; the latch has a toe portion extending forwardly relative to its flat surface; the portions of the housing providing the floors of the channelways have openings for receiving said toes at the positions of latches relative to respective thrust elements placing said flat surfaces in flush relation with respective adjacent inclined surfaces of said elements.

9. The device of claim 5 wherein: the housing has a rib projecting downwardly from an undersurface of the housing at said operative position of the device; said rib having a rearwardly facing surface aligned in said operative position of the device for assuming an approximately horizontal alignment when the device occupies a desired downwardly-tilted inoperative position adapting said rib surface to cooperate with an undersurface of a vehicle in preventing unwanted rearward swinging the device.

10. The device of claim 5 wherein: the housing has a lower bearing portion arranged with respect to a transverse horizontal axis; and the device comprises a lock arm supported by the bearing portion for rotation about said bearing axis; said lock arm being rotatable to a position aligning it uwardly and forwardly from its axis when the device occupies a desired downwardly-tilted inoperative position adapting the arm to engage said coupling member of a vehicle to prevent undesired forward swinging of the device.

11. The device of claim 5 wherein: the housing comprises understructure forming a bearing portion arranged with respect to a transverse horizontal axis, and a rib projecting downwardly underneath the housing; a lock arm is rotatably supported by the bearing portion; said rib has a rearwardly-facing surface aligned at said operative position of the device for assuming an approximately horizontal alignment when the device occupies a desired downwardly-tilted inoperative position; said arm being rotatable at said inoperative position of the device to a position aligning it upwardly and forwardly.

12. The device of claim 11 wherein: the thrust elements have rear abutments of greater vertical length than the rear openings of the passageways, each of said abutments provides one of said abutment areas and a rearward facing inclined surface extending downwardly from the lower extremity of the abutment area and forwardly at an angle with the plane of said area; the lower portion, including said lower extremity, of each abutment has a recess indented forwardly from a lower section of its abutment area and the inclined surface thereof; a latch having a rear flat surface is supported within the recess pivotally with respect to a horizontal axis; said latch and the flat surface extend downwardly beyond said abutment area; said latch axis is located relative to the abutment for pivoting of the latch between a position wherein said flat surface thereof is flush with said area and a position wherein it is flush with said adjacent inclined surface adjacent said area; the latch has a toe portion extending forwardly relative to its flat surface; the portions of the housing providing the floors of the channelways have openings for receiving said toes at the positions of latches relative to respective thrust elements placing said flat surfaces in flush relation with respective adjacent inclined surfaces of said elements.

13. In combination, a vehicle having a vertical end-surface facing away from the vehicle in the direction of draft, a coupling member projecting in said direction away from said surface, and a transitional coupling device comprising: a coupler head; means for supporting the coupler head forwardly with respect to said member; means for connecting the supporting means in pivotal relation with the coupling member with respect to an axis in forwardly-spaced, horizontally-parallel relation with said end-surface; with the supporting means spaced forwardly from said end-surface; thrust means supported by the supporting means at the position of the supporting means placing the coupler head in coupling position in forwardly and rearwardly reciprocable relation with the supporting means; the thrust means projecting longitudinally rearwardly from the supporting means into engagement with said end surface; and resilient means acting between the supporting means and the thrust means urging the latter against said end surface; the engaging areas of the thrust means and said end surface being generally complementary in a vertical direction and extending below said axis at said position of the supporting means.

14. In combination, a vehicle having a vertical end-surface facing away from the vehicle in the longitudinal forward direction thereof, a coupling member projecting in said direction away from said surface, and a transitional coupling device comprising: a coupler head; means for supporting the coupler head in swingable relation with said member including means for connecting the supporting means in pivotal relation with the coupling member with respect to an axis in forwardly spaced, horizontally parallel relation with said end-surface; thrust means supported by the supporting means, at the position of the supporting means placing the coupler in its normal coupling position, in forwardly and rearwardly reciprocable relation with the supporting means; the thrust means projecting rearwardly from the supporting means at said position of the latter to position a rear abutment area of the thrust means in engagement with said end surface; and resilient means acting between the supporting means and the thrust means urging the abutment area against said end surface; said abutment area, at said position of the support means, being vertically complementary with said end-surface; the abutment area having a vertical length below said axis at said position of the device in combination with the expansion force of the resilient means providing a frictional force between said abutment area and said end-surface for maintaining the device in said position.

15. The combination of claim 14 wherein: the thrust means and the supporting means have cooperating stop portions preventing complete separation of the thrust means from the supporting means; the downward extent of said vertical length is limited to enable manual tilting of the coupler downward relative to the coupler member; and the relative positions of said end-surface, said axis, and said device are such that the difference of the distance between the axis and said end-surface and the distance between the axis and the lower extremity of said rear abutment area is less than the range of movement through which the thrust means may move away from the end-surface toward the supporting means at said position of the latter.

16. The combination of claim 15 wherein: said thrust means has a rearwardly-facing inclined surface extending downwardly from the lower extremity of the rear abutment area and forwardly at an angle with the plane of said area.

17. In combination, a vehicle having a vertical end-surface facing away from the vehicle in the direction of draft, a coupling member projecting in said direction away from said surface, and a transitional coupling device comprising: a housing generally open along a central longitudinal vertical plane, except for cross-tie structure, to form a chamber for receiving said member; means extending between opposite lateral walls of the chamber along an axis in horizontally-parallel forwardly-spaced relation with said end surface connecting the housing in pivotal relation with said member and in forwardly spaced relation with said end-surface; said housing having two parallel channelways at opposite sides of the chamber extending horizontally, at an upward operative position of the device, between respective terminal forward and rear openings; a coupler having a coupler head facing, at said position of the device, in said draft direction, and a pair of horizontally spaced parallel shanks extending in a rearward direction with respect to said draft direction, each shank extending through one of said front openings into the associated channelway; said housing and shanks having cooperating stop portions preventing complete withdrawal of the shanks from the channelways; a pair of thrust elements, each partially extending through one of said rear openings into the associated channelway; and spring means compressively enclosed within each channelway between, and in engagement with, the element and shank extending into such channelway; the engaging areas of the thrust elements and said end-surface being generally complementary in a vertical direction and extending below said axis at said position of the device.

18. The combination of claim 17 wherein: each of the opposed inner surfaces of said lateral walls taper toward an intersection of said vertical longitudinal plane and a transverse vertical plane containing said axis.

19. The combination of claim 17 wherein: each thrust element and the housing have cooperating stop portions preventing complete withdrawal of the elements from the channelways.

20. The combination of claim 19 wherein: each thrust element has a rearwardly-facing inclined surface extending downwardly from the lower extremity of its abutment area; and, at said operative position of the device, the relative positions of said end surface, said axis, and said device are such that the difference of the distance between the axis and said end surface and the distance between the axis and said lower extremity of each abutment area is less than the range of movement through which the respective thrust means may move from the end surface toward the housing.

21. The combination of claim 20 wherein: said vehicle has a transverse sill providing said end surface and a horizontal undersurface; and said housing has a rib projecting downwardly from a forward undersurface of the housing; said rib being angularly spaced from said sill undersurface by an angle equal to the angle traversed by the device between said position and a predetermined downwardly-tilted position of the device; said rib having a rearwardly-facing surface angled with respect to the housing to engage the undersurface in face-to-face relation at said downwardly-tilted position of the device.

22. The combination of claim 20 wherein: as said housing and coupler rotate to a downwardly-tilted position, a forward portion of said coupling member is displaced upwardly within said chamber to provide an open space within the lower part of said chamber; said housing having a lower bearing portion arranged with respect to a transverse horizontal axis; and the device comprises a lock arm supported by the bearing portion for rotation about said bearing axis into subjacent relation with an undersurface of the coupling member at said downwardly-tilted position of the device.

23. The combination of claim 17 wherein: said coupling member is hook-shaped with a forward neb portion pointing upwardly to form a clevis-receiving slot having its closed end disposed downwardly with respect to its open end, and said axis for connection of the device and the coupling member is disposed rearwardly of said slot; and the upper portion of said housing is contoured to substantially expose the slot from opposite lateral directions of the member at a desired downwardly-tilted inoperative position of the device.

24. The combination of claim 17 wherein: the opposing interior surfaces of the housing are each tapered inwardly toward the intersection of said longitudinal vertical plane and a transverse vertical plane including said axis; and said hole of the member is tapered inwardly from opposite sides of the member.

25. The combination of claim 17 wherein: the vehicle includes a draft gear interposed between the member and the vehicle, the draft gear being yieldable to draft forces in excess of a predetermined magnitude to allow movement of the member relative to said end surface positioning said device away from the end surface; a transverse end sill of the vehicle provides said end surface and a horizontal undersurface; said housing has a rib extending transversely to said central plane and projecting downwardly from the undersurface of said housing; said rib has a rearwardly facing surface displaced about said axis from said undersurface at an angle equal to that traversed by the device in rotating from said operative position to a predetermined downwardly-tilted position; said device, in swinging to the latter position, displacing said member from the lower forward region of said chamber; the housing has a bearing portion arranged with respect to a transverse horizontal axis; and a lock arm is supported by said bearing portion for rotation about said bearing axis, at said downwardly-tilted position of the device, into said lower forward region and subjacent relation with the coupling member.

26. The combination of claim 25 wherein: said member is hook-shaped with the forward neb portion thereof extending upwardly and a clevis-receiving slot thereof has its closed end disposed below its open end; said member has a transverse hole rearwardly of the slot; the connecting means is a pin anchored in said lateral walls and extends through said hole; the inner opposing surfaces of said lateral walls are tapered toward an intersection of said central longitudinal plane and a vertical plane containing said axis of connection.

27. The combination of claim 23 comprising: means extending said thrust elements and said end surface to a level below said axis; thereby extending said engaging areas to substantially preclude tilting of the device relative to the end surface.

References Cited in the file of this patent

FOREIGN PATENTS 240,714    Great Britain  _____  Nov. 15, 1911